United States Patent [19]
Kurkjian

[11] 3,731,312
[45] May 1, 1973

[54] AIR TRAFFIC CONTROL UTILIZING ROTATING RADIAL SIGNALS

[76] Inventor: Haig Kurkjian, R.D. 1, Malvern, Pa. 19355

[22] Filed: Mar. 27, 1970

[21] Appl. No.: 23,344

[52] U.S. Cl. ........343/112 TC, 343/112 CA, 343/106
[51] Int. Cl. .................................................G01s 3/02
[58] Field of Search .................343/112 TC, 112 CA, 343/106

[56] References Cited

UNITED STATES PATENTS 2,252,083   8/1941   Luck .............................343/112 TC
2,844,817   7/1958   Green............................343/112 TC

*Primary Examiner*—Carl D. Quarforth
*Attorney*—McClure, Weiser & Millman

[57] ABSTRACT

Air traffic is controlled to follow azimuthally rotating radial signals, from an off-airport terminal omnirange station, sweeping over an air-port in a direction and at a speed suitable for approach to landing. Dual omnirange stations flanking the airport may be used similarly for control of traffic to respective dual runways or for control of departure after takeoff as well as approach to landing.

16 Claims, 4 Drawing Figures

Patented May 1, 1973

INVENTOR.
HAIG KURKJIAN
BY McCulum, Weiser
+ McCman
ATTORNEYS.

Patented May 1, 1973

INVENTOR.
HAIG KURKJIAN
BY McClure, Weiser
& Millman
ATTORNEYS.

Patented May 1, 1973

INVENTOR.
HAIG KURKJIAN
BY McClurg, Weiser
+ Millman
ATTORNEYS.

AIR TRAFFIC CONTROL UTILIZING ROTATING RADIAL SIGNALS

This invention relates to a system for control of air traffic through use of radio signals.

A principal existing aid to navigation of aircraft is the omnirange radio station, or VOR, i.e., "very high frequency omnidirectional range." VOR signals are interpreted conventionally as radials radiating therefrom (viewed in plan) like the spokes of a horizontal wheel concentric with the station. Such radial signals are azimuthally characteristic, being distinguishable from one another according to their direction from the station. Notwithstanding such use of the term "range", the azimuthally characteristic signals from such a station provide information about direction only, rather than distance. Conventional transmitters of DME or TACAN type may be present at the same station for the purpose of transmitting signals characterizable by appropriate receiving equipment in terms of distance, speed, or time to station. Such receivers are much less common in aircraft than are navigation receivers for VOR signals.

Congestion is becoming a problem in high-density air traffic terminal areas, including routes for approach to landing and for departure after takeoff as well as runways and adjacent ground facilities of airports. As is obvious, an airport is a bottleneck for air traffic, and the problem is aggravated not only by traffic density but also by diverse performance characteristics of the aircraft being funneled into and out of the airport and by reason of operation of the aircraft under diverse flight rules, such as what are now known as visual flight rules (VFR) and instrument flight rules (IFR). Many proposals have been made for coping with the air terminal traffic problem, but there has been no satisfactory solution that is simultaneously easy for controllers to administer and for pilots to follow, that also poses essentially no safety problem, and that can be accomplished without requiring additional navigation equipment in the aircraft.

A primary object of the present invention is provision of a system of terminal air traffic control for which retraining of controllers and pilots is minimized.

Another object is provision of such a system in which separation of terminal traffic by reason of differences in aircraft performance is assured.

A further object is provision of such a system operable by use of navigation receivers in most common use.

Other objects of this invention, together with means and methods for attaining the various objects, will be apparent from the following description and the accompanying diagrams.

In general, the objects of the present invention are attained, in a system of aircraft traffic control in terminal airspace wherein an airport has nearby an omnirange station adapted to broadcast azimuthally characteristic radial signals, by imparting an azimuthal rotation to the signals to sweep over the airport in a direction and at a speed suitable for air traffic approach to landing. Approaching aircraft are controlled to orbit the station on a designated rotating radial until entering a landing pattern, which itself may be entirely conventional. Departing aircraft may be constrained similarly to follow designated rotating radials for at least part of their departure paths.

Figure 1:
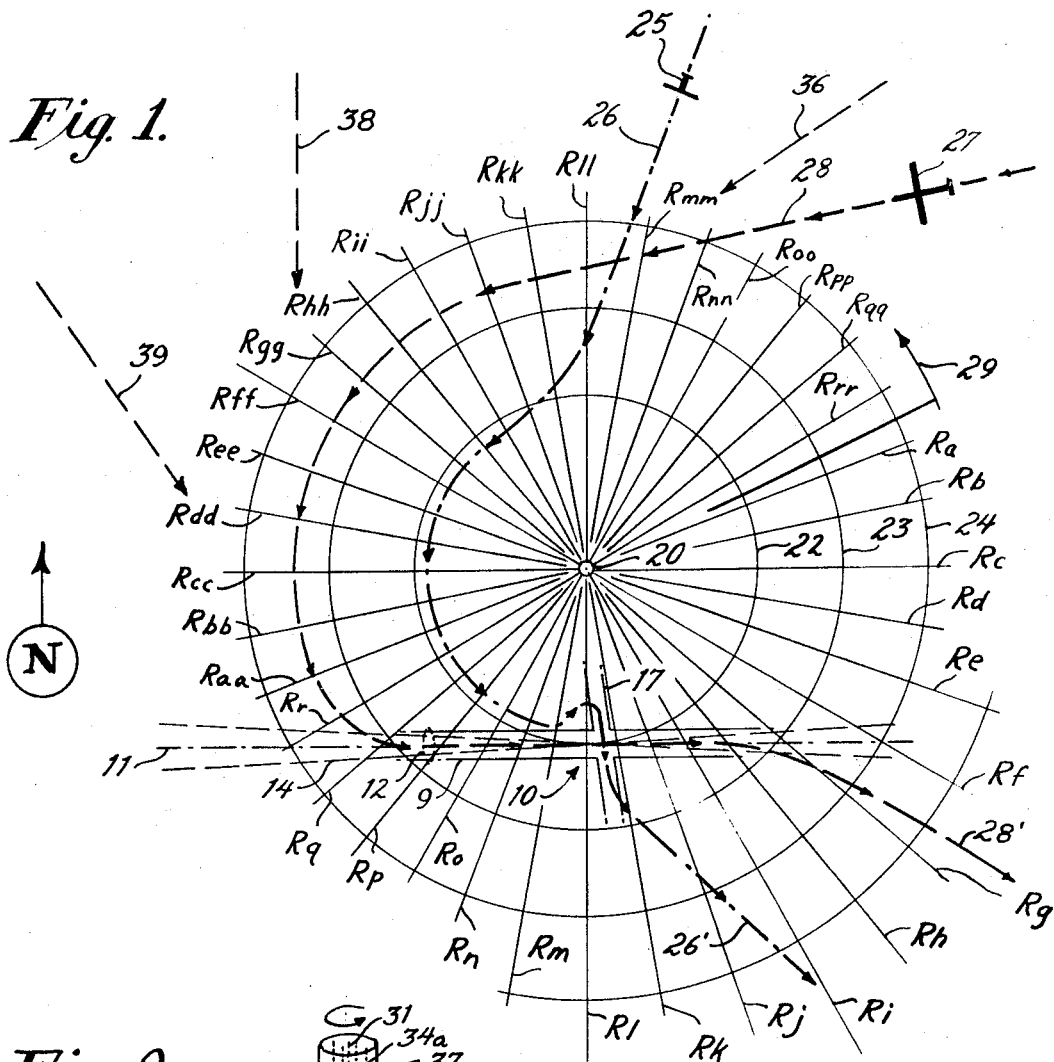
FIG. 1 is a schematic diagram of a first embodiment of air traffic control system according to the present invention.

FIG. 1 shows in schematic plan a terminal area containing airport 10 with runways (shown fragmentarily and greatly enlarged) 9 and 17. Fan marker 12 is shown superimposed upon centerline 11 of runway 9 left of the intersection, and localizer beam 14 extends along and flanking that centerline. Also superimposed in this view is a gridwork of radials $R_a, R_b, \ldots R_q, R_r, R_{aa}, R_{bb} \ldots R_{qq}, R_{rr}$ radiating from terminal omnirange station 20. Successive distance circles 22, 23, 24 are concentric therewith, and the airport is distant from the station by the radius of circle 22.

Additionally superimposed (in broken lines) on FIG. 1 are approach path 26 of small aircraft 25 and approach path 28 of larger aircraft 27. Entering from the upper right, the respective aircraft orbit the station through approximately semicircular arcs, smaller for the light aircraft and larger for the heavier aircraft, until nearing or reaching runway 9. Aircraft 27 follows an instrument landing pattern straight in onto runway 9, and aircraft 25 is diverted into a right-hand traffic pattern to land on runway 17. Departure paths 26' (from runway 17) and 28' (from runway 9) of the respective aircraft also are shown.

Radials $R_a, R_b, \ldots R_q, R_r, R_{aa}, R_{bb}, \ldots R_{qq}, R_{rr}$ are shown ten degrees of arc apart and are designated successively herein by R plus each of eighteen successive single-letter subscripts and a like number of double-letter subscripts. The designation begins at the first radial clockwise from the radial extension of arrow 29 and progresses from there; $R_{aa}$ is the reciprocal of (i.e., 180 degrees from) radial $R_a$, and $R_{bb}$ is the reciprocal of $R_b$, etc. Such subscript designation is a shorthand for conventional numerical designation, according to which these 36 radials would be designated 010, 020, ... 350, 360°. Thus, if the radials were stationary, as in the case of a conventional omnirange station, each radial would designate an azimuthal direction from the station itself and would be so interpreted by an aircraft navigation receiver. Such stations are well known in the art and do not require extended description here.

In summary, a conventional type of VOR station comprises radio transmitting equipment adapted to transmit azimuthally characteristic signals. One way in which this is done is by producing a VHF carrier (e.g., in the 108 to 118 megahertz band) modulated by both a reference low-frequency signal (e.g., 30 hertz) transmitted equally in all azimuthal directions and by a similar but directional signal transmitted with azimuthally phase-distinguishable characteristics. This is done conveniently by amplitude-modulating the carrier directly with the variable-phase signal and separately with a subcarrier (e.g., about 10 kilohertz, perhaps 9960 hertz) frequency-modulated with the reference signal. The latter is transmitted by a centrally located antenna free of directional characteristics, and the former is transmitted by antennas (usually four in number) equally spaced about the central antenna, thereby rendering it azimuthally characteristic. Also included in the amplitude modulation of the carrier is a station identifier, which may be at voice frequency or coded tone in the audio range.

The aircraft navigation receiver simply detects the low-frequency variable-phase signal (as well as the station identifier) and the sub-carrier, sends the subcarrier to an FM detector to obtain the reference signal, then compares the variable-phase and reference signals in a phase-detector to ascertain on what radial from the station the aircraft is located. The resultant information is presented on a conventional instrument (called an "omnibearing selector" or OBS, which may be incorporated in a more comprehensive instrument, such as a "flight director") having a rotatable azimuth (radial) scale and a deflectable needle that centers when the radial indicated on the azimuth scale is the radial on which the aircraft is located. The needle deflects to one side or the other when the aircraft intercepts a radial other than that indicated on the scale, except for the reciprocal radial.

Figure 2:
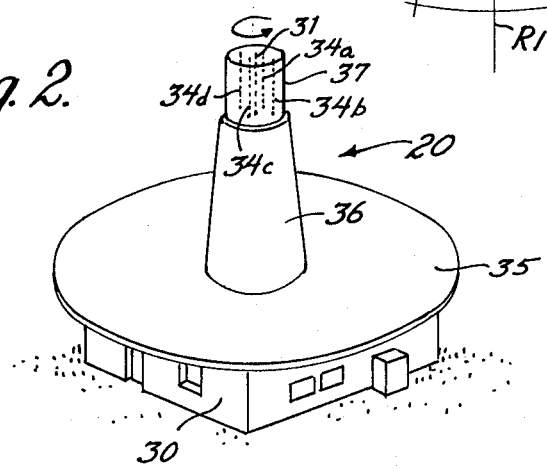
FIG. 2 is a perspective view of a ground transmitting station of radio signals useful according to the invention.

FIG. 2 shows an omnirange station of the type described briefly above modified for use according to this invention by rotation of the antenna assembly. Station 20 comprises a transmitter house or "shack" 30 having on top thereof flat circular roof 35, which provides a reflecting plane, surmounted by frustoconical tower 36 on top of which is cylindrical housing 37 for the antennas: central reference signal antenna 31 and surrounding phase-signal antennas 34a, b, c, d. Whereas the antenna housing is conventionally stationary, in the practice of the present invention the antenna housing is rotated at constant speed about its vertical axis as indicated by the adjacent arrow. Suitable speed of rotation depends upon the distance between station and airport but usually will be on the order of tens of degrees per minute, e.g., 20° per min.

Rotation of the antenna housing causes like rotation of the azimuthally characteristic signals and the associated radials. Such rotation is indicated in FIG. 1 by the arcuate arrow terminated by an undesignated fragmentary radial line, appearing at the upper right of the view. It will be understood that the designation of radials at ten-degree intervals is merely exemplary and that the station emits an infinitude of radials; OBS scales usually are marked at five-degree intervals although readable to about a degree. In the actual practice of this invention intervals of five or ten degrees will suffice, as will be apparent from the following operational description.

Aircraft approaching the station will be controlled initially, when the radials are rotating counterclockwise as shown, to approach from a generally northern direction, such as indicated by paths 26 and 28 or arrows 36, 38, and 39. Such control may be by voice transmission, as from an approach controller to the aircraft pilot or as an addendum to the station identifier of the terminal omnirange station, for example. The aircraft so approaches the station until reaching a radius therefrom at which the speed of the aircraft equals the rotational speed of the radials at such radius, whereupon the aircraft orbits the station on a particular radial, which usually will be designated by a controller, until entering a landing pattern. This procedure may involve communication to and from controller and pilot. If desired, the procedure may be automated partially or wholly, especially where the aircraft and the station have DME (distance-measuring equipment) capability, by means of automatic-pilot radio equipment in the aircraft adapted to couple to the designated radial and to maintain the desired orbiting distance from the station, as will be readily understood by those skilled in the art. The controller, whether human or otherwise, may monitor the performance by radar observation of the aircraft.

When a human pilot has the responsibility for proper approach procedure (and it is anticipated that the ultimate responsibility will be his for the foreseeable future, regardless of the degree of automation provided to aid such navigation) he can check his progress readily by observation of the OBS needle, with the designated radial dialed onto the azimuth scale. If the aircraft speed exceeds the speed of the radial at the orbiting distance, the needle will deflect o the left of center, indicating that the aircraft should turn left somewhat, whereupon the aircraft can intercept the radial closer to the station, at a radius where its linear speed is less. Contrariwise, if the needle deflects to the right of center. Of course, aircraft speed may be adjusted in addition to or sometimes instead of making directional corrections.

After partial orbiting of the station on the designated radial the aircraft is directed into a suitable landing pattern. Thus aircraft 25 following path 26 orbits on such radial at a speed of ninety or a hundred knots, for example, just inside distance circle 22, which may be at about 6 miles (nautical) from the station. This aircraft is assumed to be operating VFR, so the airport will become visible as the aircraft swings around toward the east, whereupon the controller can direct it readily into a right-hand traffic pattern for runway 17. Aircraft 27, however, which is operating IFR (even if actual conditions are satisfactory for VFR operation) follows path 28 and orbits on its designated radial between distance circles 23 and 24 (at respective radii of about seven and eight miles, for example) as at a speed of about 150 or 60 knots, until intercepting localizer beam 14. Then aircraft 27 may complete an otherwise conventional instrument approach straight in to runway 9, following the localizer beam (with or without glide slope), passing over fan marker 12, which may be an outer, middle, or inner marker, and disregarding its position relative to the previously designated radial. Alternatively, in further accord with this invention, adherence to such radial may be continued while on the localizer beam, requiring reduction in ground speed because the radius from the station is being reduced. Such speed reduction usually will induce descent along an appropriate glide path in conformity with or substitution for that provided by glide slope equipment.

It will be understood, of course, that at the crossover of paths 26 and 28 of respective aircraft 25 and 27, aircraft 25 will be at a lower altitude than aircraft 27, both normally and according to approach procedure of the present invention. Also, of course, aircraft will be controlled to enter the approach pattern at appropriate intervals to intercept and orbit on radials suitably spaced from one another in the interest of safety. Orbiting for one or more complete turns on designated radials may be employed to shuttle aircraft safely from higher altitudes to suitable approach altitudes.

Departures are handled either similarly to or somewhat differently from approaches in this first embodiment of the invention, wherein only a single terminal VOR is used, depending chiefly upon aircraft performance characteristics. A relatively high-performance aircraft, such as 27, can accelerate sufficiently to take off from runway 9 and initially follow a designated radial, which requires substantial increase in ground speed with increasing distance from the VOR station, after which the aircraft makes a half-right turn out to the southeast, as indicated by path 28'. Lower-performance aircraft 25 takes off from runway 17 and immediately makes a half-left turn out to the southeast, as indicated by path 26'. Because of the greater speed and rate of climb of aircraft 27, there is no intersecting or overlapping of their respective departure paths.

Thus, where only a single terminal omnirange station is used in the vicinity of an airport, approaches preferably are confined to the station side of the airport and departures to the opposite side. Of course, aircraft approaching from the opposite side or departing from the same side are expected to maneuver appropriately when beyond the terminal area so as to avoid interference. Usually there is no necessity to use an approach radius of more than about ten miles, corresponding to a speed exceeding two hundred knots at a radial rotation of 20° per minute, and a radius of from 15 to 20 miles would clear departures as well. The direction of radial rotation may be reversed, if desired, as by reason of change in wind direction, with reversal in the traffic patterns, as will be readily understood. The direction of radial rotation can be broadcast conveniently along with the station identifier as well as by controllers or otherwise.

Figure 3:
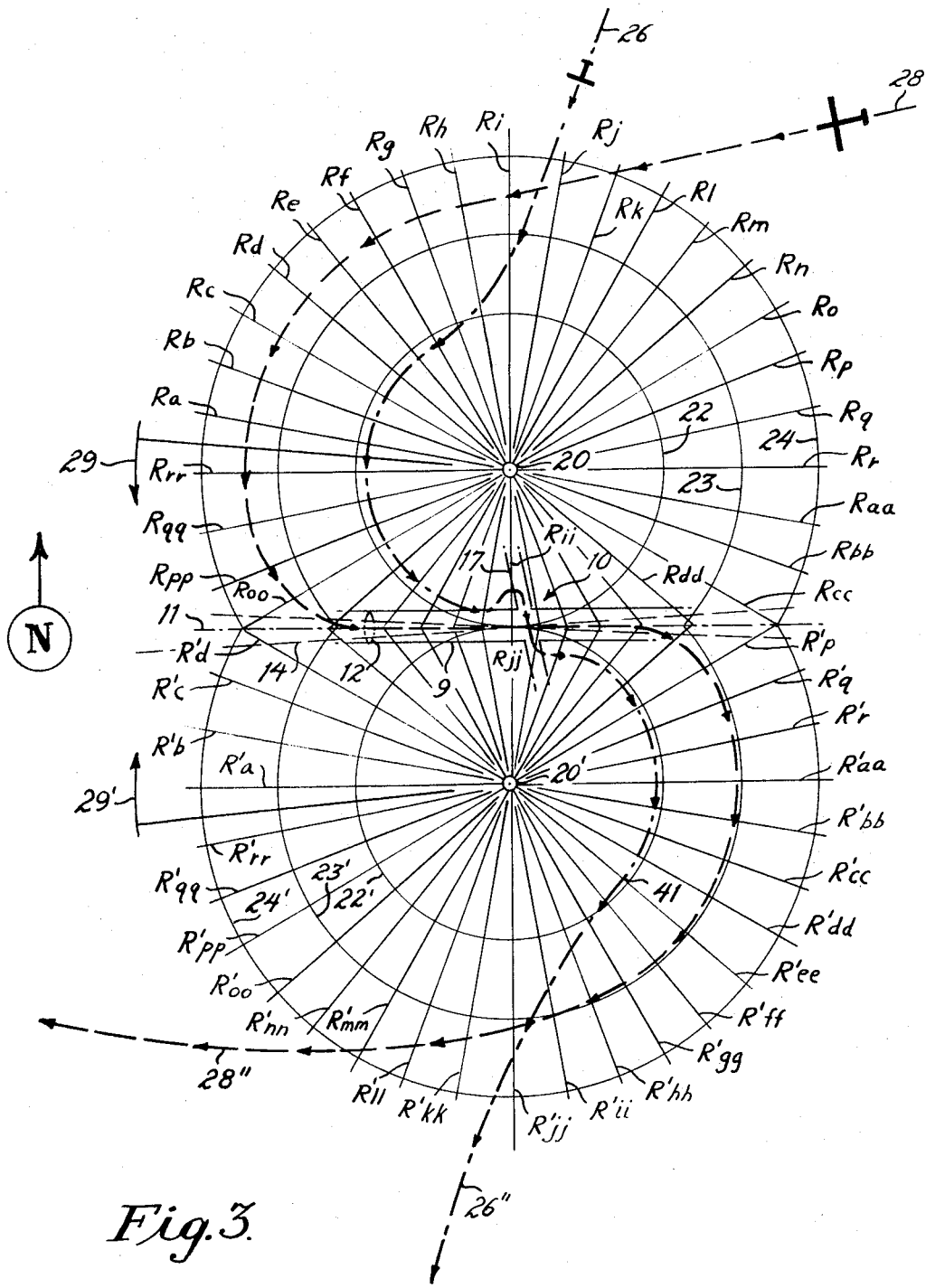
FIG. 3 is a schematic diagram of a second embodiment of air traffic control system according to this invention.

More sophisticated control of departing, as well as approaching, aircraft is provided according to another embodiment of the present invention, illustrated in Fig. 3. In this second embodiment, in which airport 10 and omnirange station 20 are shown as before, another omnirange station is added: station 20' is located at preferably the same distance from the airport as station 20 but on the opposite side therefrom. In the illustration, stations 20 and 20' flank the airport, and centerline 11 of runway 9 is a perpendicular bisector of the straight line interconnecting the two stations (corresponding to respective radials $R_H$ and $R_j$ at the moment of rotation shown in FIG. 3). Reference characters to designate certain of the radials, especially most of those meeting over the station, are omitted in the interest of clarity. The radials from station 20' are designated similarly to those from station 20 but with the R primed, thus: $R'_a$, $R'_b$, ... $R'_q$, $R'_r$, $R'_{aa}$, $R'_{bb}$, ... $R'_{qq}$, $R'_{rr}$. If it is inconvenient to locate both stations at identical distances from the airport, the rate of rotation of the further station preferably will be adjusted sufficiently slower than the rate of rotation of the radials of the nearer station so that the ground speed of the radials from both stations are synchronized to be identical at the airport. The frequency upon which station 20' broadcasts is different, of course, from the frequency of station 20.

In this embodiment, shown in FIG. 3, approaching aircraft are controlled in accordance with the FIG. 1 description, which will not be repeated here. However, departing aircraft are controlled further by reference to the rotating radials of omnirange station 20', as follows. Aircraft 25 takes off from runway 17 as before but now proceeding generally toward station 20', where the speed of the radials over the ground is less. Thus, it is simple for aircraft 25 to make a left turn out onto a designated radial on which it can orbit the station at climb-out speed, such as about 90 knots. When the controller is satisfied that the aircraft has so proceeded to a suitable altitude and direction, he then releases it from the constraint of orbiting on that radial, as at point 41 on its departure path (here designated as 26" to distinguish it from path 26' of FIG. 1), whereupon it maneuvers to an enroute course dependent upon its destination.

Similarly, in FIG. 3 faster aircraft 27 makes a left turn out onto a radial with larger radius, such as at a speed approaching 200 knots, and orbits the station through an appropriate arc (here shown as almost a semicircle) before being released from such constraint. It will be understood that at the indicated cross-over of departure paths 26" and 28" aircraft 27 will have climbed to a higher altitude than aircraft 25, so that a safe separation is assured.

In a departing aircraft the OBS will show a left needle if the aircraft is traveling faster than the designated radial, in which event turning left slightly will increase the radius to a faster radial ground speed, thereby correcting in the same manner as a pilot corrects the course during enroute navigation. Conversely, turning more to the right will correct for aircraft speed deficiency. Thus, the human pilot need not get acquainted with any new equipment or learn any new navigation technique for either approaches or departures according to this invention Where DME is used, as is desirable, observation of the distance from the station, as presented on the DME indicator in the aircraft, enables the pilot to make appropriate adjustments (as in power, for example) to make certain that the aircraft is maintaining the designated orbiting radius. This also may be automated, if desired, by appropriate setting of an autopilot having suitable interconnection of a course coupler and an orbiting mode.

Figure 4:
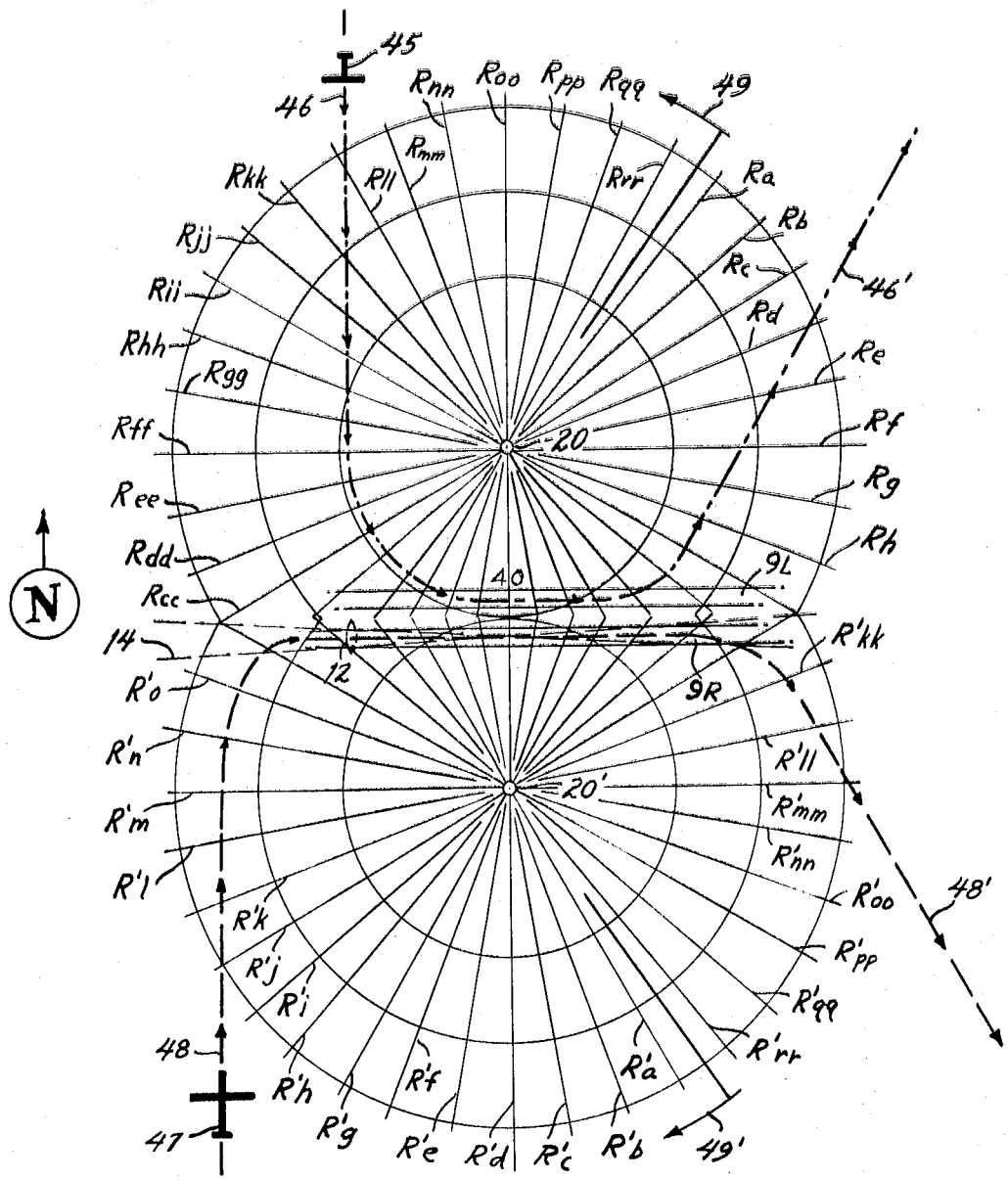
FIG. 4 is a schematic diagram of a third embodiment of air traffic control system according to the invention.

A third embodiment of this invention, shown in FIG. 4, is for use with dual parallel runways, such as runway 9L (left) and 9R (right) of airport 40 shown substituted for airport 10 between omnirange stations, 20 and 20'. It should be remembered that the showing of the runways not only is way out of scale compared to the distance from the stations but also that the runway width is exaggerated with respect to the lateral spacing between the runways, which is many (e.g., 10 to 20) times the runway width. Only runway 9R is shown with a localizer beam, as when runway 9L will be used only for VFR operations. However, where traffic is particularly heavy and adequate lateral separation is available, both runways may be equipped with instrument landing systems, including localizer beams (on different frequencies) as will be readily understood.

In this embodiment, aircraft 45 in the upper left (northwest) quadrant approaches on path 46, orbiting on a designated radial, and lands on runway 9L. After subsequently taking off on the same runway, it departs to the upper right, with or without a necessarily brief period of orbiting (as shown) via departure path 46'. Similarly, aircraft 47 approaches at the lower left, orbits, and lands on runway 9R, after which it takes off on that runway and departs via path 48', with or without a brief period of orbiting. All aircraft follow both landing and takeoff traffic patterns conforming to the runway position, i.e., left traffic patterns to and from runway 9L, and right traffic patterns to and from runway 9R. In this regard there is less freedom of action than in the previous embodiments, but that is generally true in operations involving dual runways because of the parallellism in directions of landing (and taking off). Arrows 49 and 49' mark radial rotation and designation from stations 20 and 20' (as arrows 29 and 29' did in FIG. 3).

It will be understood that in all embodiments of the invention the direction of radial rotation may be reversed if desired, as because of change in wind direction, for example. The fact of reversal, or of intended reversal, may be broadcast as an addendum to station identifier or otherwise.

Advantages of convenience and safety accruing in the practice of this invention have been mentioned above and are apparent. An added benefit is economic, inasmuch as no change in aircraft navigation equipment is required; the addition of terminal omnirange stations is compensated for by resulting simplification of controller work load. Although explained in large part with reference to operation by human controllers and pilots, adaptation to an increasing degree of automation is inherent and will be readily appreciated by those skilled in the art. Thus, computerized control may replace human control to an unlimited extent while using essentially the same control system.

The present invention is also adapted for use with Doppler omnirange equipment, wherein the variable phase signal is modulated onto the 10 kilohertz subcarrier, contrary to the conventional VOR described above, by appropriate alteration in the rotating distribution system to the multiple (such as 50) antennas concentric with the single reference signal antenna.

Other modifications may be made, as by addition, combination, or subdivision of parts or steps, while retaining some or all of the advantages and benefits of this invention. The invention itself is defined in the following claims.

I claim:

1. In aircraft traffic control in terminal airspace wherein an airport is within range of an omnirange station located off the airport and adapted to broadcast azimuthally characteristic radial signals, the improvement comprising imparting an azimuthal rotation to the signals to sweep over the airport in a direction and at a speed suitable for air traffic approach to landing.

2. Aircraft traffic control according to claim 1, including the step of designating a certain rotating radial upon which an approaching aircraft is to orbit the omnirange station until entering a landing pattern.

3. Aircraft traffic control according to claim 2 wherein a portion of the landing pattern is provided by a localizer beam aligned with the desired landing location for intersection by successive radial signals.

4. Aircraft traffic control according to claim 1, wherein the distance of the omnirange station from the airport is about 5 to 10 miles, and the rate of rotation of the radial signals is about 20° per minute.

5. Aircraft traffic control according to claim 4, wherein landing aircraft are controlled to make a left traffic entry when the direction of rotation of the radial signals is counter-clockwise, and a right traffic entry when the direction of rotation is clockwise, as viewed in plan.

6. Aircraft traffic control for terminal airspace, comprising broadcasting azimuthally characteristic radial signals sweeping azimuthally at constant velocity over a nearby airport in a direction and at a speed suitable for approach to landing of aircraft, designating a certain radial to be followed by a given approaching aircraft, and controlling the aircraft to orbit the omnirange station on that radial until entering a conventional landing pattern.

7. Aircraft traffic control according to claim 6, including the step of designating a certain altitude to be followed by the given approaching aircraft during the orbiting of the station by the aircraft.

8. Aircraft traffic control according to claim 6, including the steps of directing IFR traffic to land essentially tangentially to the radial and directing VFR traffic to land in a more nearly radial direction.

9. Aircraft traffic control according to claim 6, including the step of providing to the aircraft an indication of any deviation of the aircraft from the designated radial.

10. Aircraft traffic control for terminal airspace, comprising broadcasting azimuthally characteristic signals from a pair of omnirange stations flanking an airport and counter-rotating the radial signals from the respective signals azimuthally in opposite directions synchronously.

11. Aircraft traffic control according to claim 10, including the steps of controlling approaching aircraft by use of the signals from one of the stations and controlling departing aircraft by use of the signals from the other station.

12. Aircraft traffic control according to claim 11, including the step of constraining approaching aircraft to orbit the first station on a designated radial thereof until entering the landing pattern and constraining departing aircraft to orbit the second station on a designated radial thereof until leaving the departure pattern.

13. Aircraft traffic control according to claim 12, wherein the approaching aircraft and departing aircraft are constrained to follow oppositely directed traffic patterns.

14. Aircraft traffic control according to claim 11, wherein dual parallel runways are used, including the steps of controlling aircraft approaching and departing one of the runways by use of the signals from one of the stations and controlling aircraft approaching and departing the other runway by use of signals from the other station.

15. Aircraft traffic control according to claim 14, including the steps of constraining aircraft approaching for landing on the first runway to orbit the first station on a designated radial thereof, and constraining aircraft approaching for landing on the second runway to orbit the second station on a designated radial thereof, before entering a landing pattern.

16. Aircraft traffic control according to claim 15, wherein aircraft approaching and departing via each runway are constrained to follow oppositely directed traffic patterns.

* * * * *